US005561486A

United States Patent [19]

SanGregory

[11] Patent Number: 5,561,486
[45] Date of Patent: Oct. 1, 1996

[54] ASSEMBLY FOR USE IN ELECTROMAGNETIC ACTUATOR

[75] Inventor: Jude A. SanGregory, Spenceport, N.Y.

[73] Assignee: Eastman Kodak Company, Rochester, N.Y.

[21] Appl. No.: 314,831

[22] Filed: Sep. 29, 1994

[51] Int. Cl.$^6$ ................................ G03B 9/08; H01F 7/08
[52] U.S. Cl. ...................... 396/463; 335/228; 335/229; 335/125; 335/266
[58] Field of Search .................. 354/234.1; 335/125, 335/228, 272, 229, 266; 310/36

[56] References Cited

U.S. PATENT DOCUMENTS

| | | | |
|---|---|---|---|
| 3,628,073 | 12/1971 | Berney | 310/36 |
| 3,638,550 | 2/1972 | Hereford | 335/272 |
| 4,187,452 | 2/1980 | Knapp et al. | 310/36 |
| 4,319,823 | 3/1982 | Hashimoto | 354/234 |
| 4,329,672 | 5/1982 | Stahl et al. | 310/36 |
| 4,333,722 | 6/1982 | Lee | 354/234 |
| 4,410,255 | 10/1983 | Hirohata | 354/230 |
| 4,505,568 | 3/1985 | Asano et al. | 354/234.1 |
| 4,531,820 | 7/1985 | Petersen | 354/234.1 |
| 4,596,453 | 6/1986 | Fujino et al. | 354/234.1 |
| 4,671,637 | 6/1987 | Toyoda | 354/234.1 |
| 4,890,129 | 12/1989 | Mody | 354/234.1 |
| 5,126,720 | 6/1992 | Zhou et al. | 340/572 |
| 5,136,194 | 8/1992 | Oudet et al. | 335/272 |
| 5,155,522 | 10/1992 | Castor et al. | 354/456 |
| 5,173,728 | 12/1992 | SanGregory et al. | 354/234.1 |
| 5,304,881 | 4/1994 | Flynn et al. | 335/272 |
| 5,337,110 | 8/1994 | Dowe | 354/234.1 |
| 5,424,703 | 6/1995 | Blume, Jr. | 335/384 |

Primary Examiner—Michael L. Gellner
Assistant Examiner—Michael Dalakis
Attorney, Agent, or Firm—David A. Howley

[57] ABSTRACT

An assembly which can be used as a rotor in an electromagnetic actuator for a camera shutter. The assembly generally includes at least two pieces of magnetic material each having a north and south pole, a drive arm, means for magnetically holding the magnetic material in a fixed position relative to the drive arm and means for rotating the assembly within the electromagnetic actuator. In one embodiment of the invention, the magnetic material comprises a first magnet and a second magnet. Preferably, the first magnet and the second magnet are rectangularly shaped.

18 Claims, 4 Drawing Sheets

ASSEMBLY FOR USE IN ELECTROMAGNETIC ACTUATOR

FIELD OF THE INVENTION

The invention relates to a magnetic assembly for use in an electromagnetic actuator and, more particularly concerns a magnetic assembly for use in an electromagnetic camera shutter actuator.

BACKGROUND OF THE INVENTION

One way in which camera shutters are activated is by the use of electromagnetic devices, known as actuators. Typically, the actuator includes a permanent magnet and a device for electromagnetically producing a magnetic field, such as an armature, which is a core/coil combination which produces a magnetic field when current is applied to the coil. The actuator is operably configured by positioning the permanent magnet relative to the armature to allow the magnetic field produced by the permanent magnet to be coupled with the magnetic field produced by the armature when current is applied to the armature. In some cases, the permanent magnet is movable relative to the armature. In other cases, the armature is movable relative to the permanent magnet.

When magnetic field coupling occurs, a disequilibrium in the magnetic alignment of the permanent magnet and armature results, thereby causing the actuator's movable part, either the permanent magnet or the armature, to move to a position where the permanent magnet's magnetic field is in an alignment with the magnetic field produced by the armature. Typically, the camera shutter is operably attached to the actuator's moveable part. Thus, when current is applied to the armature's coil, and a magnetic field is produced by the armature, the resulting movement of the actuator's moveable part causes the shutter device to be activated.

For example, U.S. Pat. No. 5,173,728 by SanGregory et al, assigned to Eastman Kodak Company, issued Dec. 22, 1992, discloses a magnet and shutter assembly for an electromagnetic shutter. Specifically, the magnet and shutter assembly disclosed includes a cylindrical magnet, a shutter blade connected to the cylindrical magnet and an armature, which includes a core/coil and air gaps in the armature. The cylindrical magnet is positioned in the armature's air gap and the magnetic field produced by the cylindrical magnet is coupled with the magnetic field produced in the air gap in the armature when current is applied to the coil. As a result of the disequilibrium caused by the coupling, the cylindrical permanent magnet rotates on a fixed axis within the gap of the armature in a direction which will magnetically align the cylindrical magnet with the magnetic field produced by the armature when current is applied to the armature's coil. The rotation of the cylindrical magnet causes the shutter blade connected to the cylindrical magnet to move, thereby causing alignment of an aperture on the shutter blade and the camera's aperture.

One disadvantage of known electromagnetic devices is the inability to make use of relatively strong magnetic material because of the manufacturing expense associated with shaping such relatively strong magnetic material. For example, the permanent magnet disclosed in U.S. Pat. No. 5,173,728 is shaped cylindrically and includes a center hole, a lug and a bearing pin for alignment and attachment of the shutter blade to the permanent magnet and engagement with the bearing. Further, the lug is used to orient the north and south poles of the permanent magnet. In order to economically shape a magnet which includes alignment and orientation features, magnetic material which can be molded or pressed into shape is used. Magnetic material having relatively strong magnetic properties, such as sintered neodymium iron boron, cannot be molded or pressed into small, individual parts due to process limitations. As a consequence, such relatively strong magnetic material must be machined, which increases the manufacturing expense.

The inability to use magnetic material having relatively strong magnetic properties also creates torque, size and inertia disadvantages associated with known electromagnetic devices. Specifically, the rotation of the actuator's permanent magnet creates a torque which is transmitted to the camera shutter to activate the shutter. The stronger the magnetic properties of the permanent magnet, the greater the torque properties of the device. However, as stated above, in order to economically shape magnets with orientation and alignment features, magnetic material which can be shaped or molded is used. Such magnetic material has weakened magnetic properties. As a result, the torque properties of known electromagnetic devices are not as strong as they could be. Further, the use of relatively weak magnetic material requires the use of relatively more magnetic material to increase the torque properties of the device, thus creating size disadvantages. Moreover, the weight of the permanent magnet also increases as a result of the use of relatively more magnetic material, thus creating inertia disadvantages.

It would be desirable to provide an assembly which uses permanent magnets having relatively strong magnetic properties which can also be manufactured economically. It would be desirable to provide an electromagnetic actuator having reduced size and having improved torque and reduced inertia properties. It would be desirable to provide an assembly for an electromagnetic actuator which uses magnets which are of simple shape and that can be easily cut from larger stock having preoriented north and south poles. It would be desirable to provide a rotor for an electromagnetic actuator which holds simple shaped magnets in a fixed position relative to a drive arm and which can be economically and reliably manufactured.

SUMMARY OF THE INVENTION

In accordance with one aspect of the invention, an assembly used in an electromagnetic actuator for a camera shutter is provided which includes at least two pieces of magnetic material each having a north pole and south pole, a holding device for magnetically holding the magnetic material in a fixed position, and a device for rotating the assembly within the actuator. Preferably, the pieces of magnetic material include two or more magnets. More preferably, pieces of the magnetic material are six sided, each side being rectangular shaped.

In one embodiment, an assembly for use in an electromagnetic actuator is provided which includes a first magnet and a second magnet, a drive arm, and a device for magnetically holding the first magnet and the second magnet in a fixed position relative to the drive arm. Preferably, the holding device is made from a non-magnetic material.

In another embodiment, an assembly for use in an electromagnetic actuator is provided which includes a first magnet and a second magnet, a drive arm, a frame comprising non-magnetic material for magnetically holding the first magnet and the second magnet in a fixed position relative to the drive arm and a mechanism for rotating the frame in the actuator. In yet another embodiment, an electromagnetic actuator is provided which includes an armature for producing a first magnetic field, and an assembly which includes at least two pieces of magnetic material each having a north pole and a south pole, a drive arm, a device for magnetically holding the magnetic material in a fixed position relative to the drive arm, and a device for rotating the holding device in the actuator, the pieces of magnetic material producing a second magnetic field which is coupled to the first magnetic field, the presence of the first magnetic field causing the assembly to rotate within the actuator. Preferably, the pieces of magnetic material include a first magnet and a second magnet.

DETAILED DESCRIPTION

Figure 1:
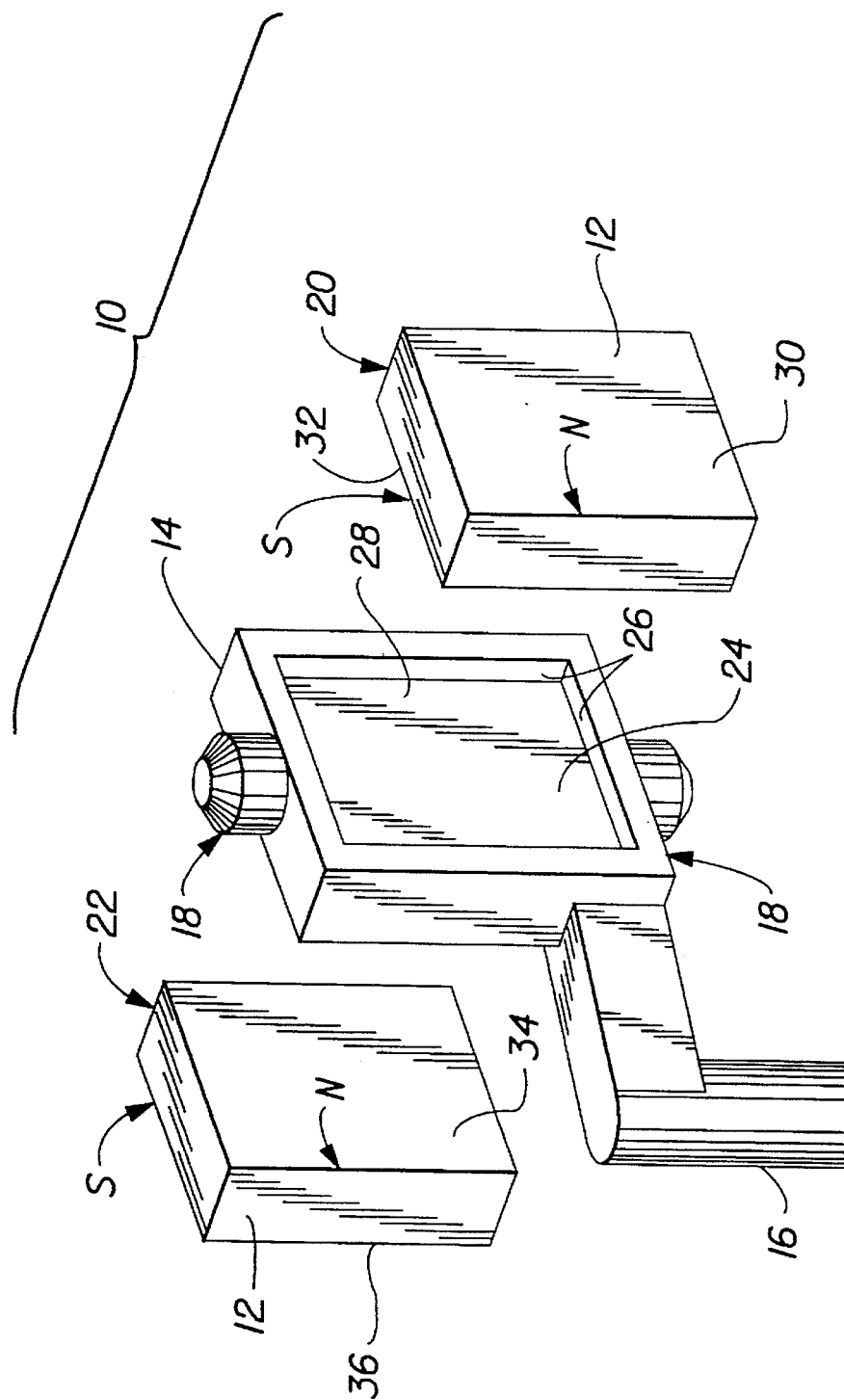
FIG. 1 is an exploded view of an embodiment of a magnetic assembly according to the present invention.
Figure 2:
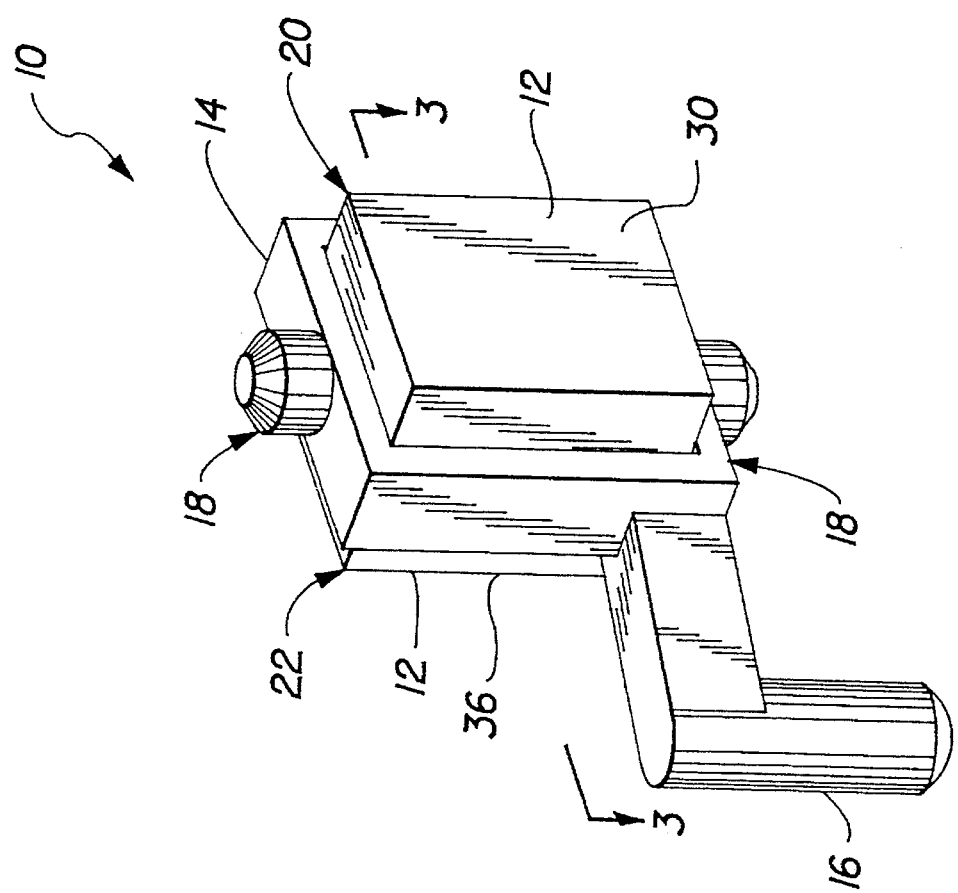
FIG. 2 is an assembled view of an embodiment of a magnetic assembly according to the present invention.
Figure 3:
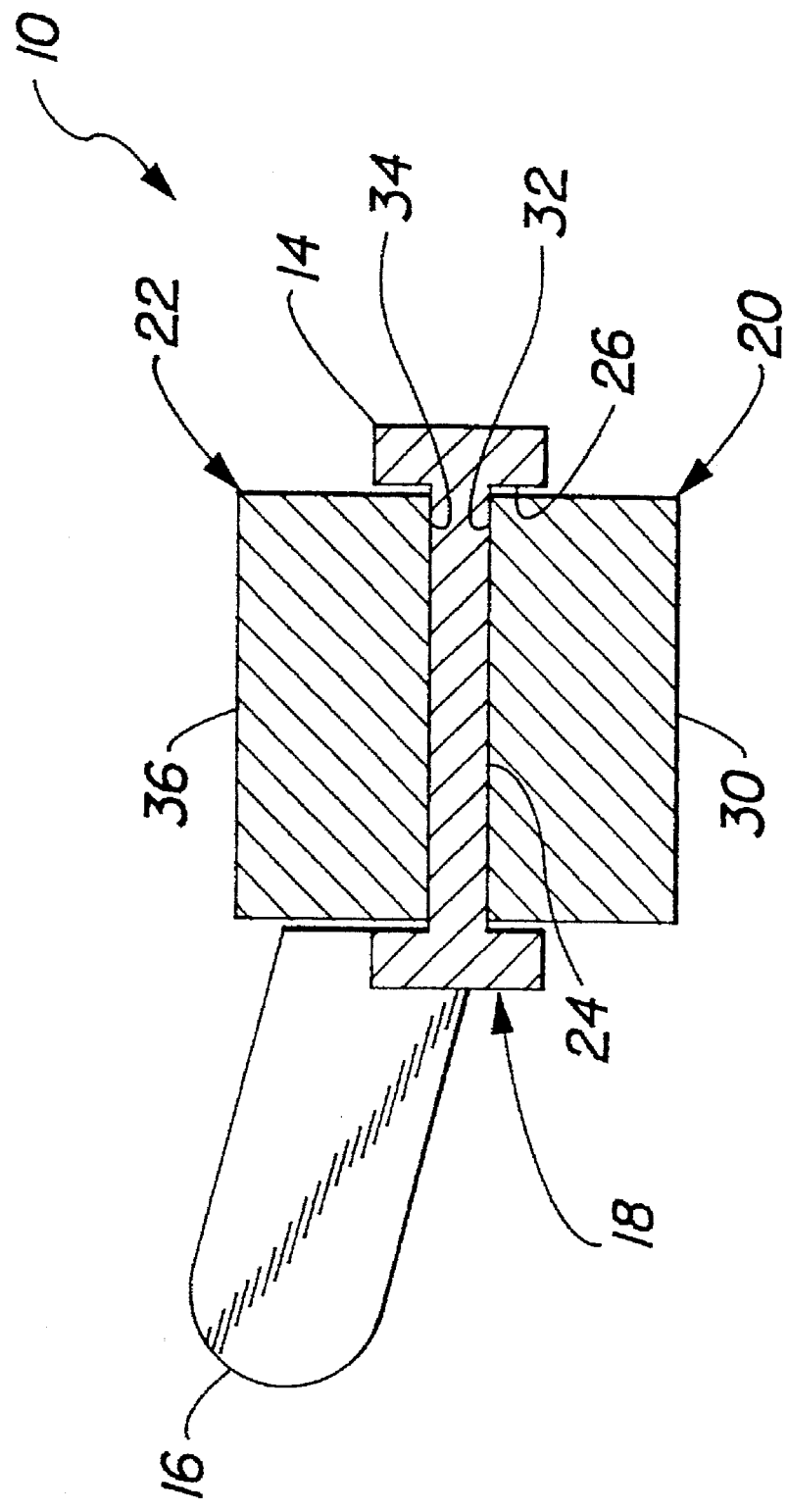
FIG. 3 is a sectional view taken along line 3—3 of FIG. 2.

An assembly 10 for use as part of an electromagnetic device embodying features of the present invention is illustrated in FIGS. 1–4. The illustrated assembly generally includes magnetic material 12 having a north pole and south pole, a holding device 14, a drive arm 16 connected to the holding device 14, and a rotating mechanism 18. In one embodiment of the invention, the assembly 10 is used in an electromagnetic actuator. Preferably, the assembly 10 is used as a rotor in an electromagnetic actuator for a camera shutter. For example, the assembly 10 of the present invention may be used in place of the cylindrical magnet disclosed as part of the magnet and shutter blade assembly for an electromagnetic shutter as disclosed in U.S. Pat. No. 5,173,728.

The magnetic material 12 can comprise any material having magnetic properties. Preferably, a magnetic material 12 having relatively strong magnetic properties is used. Preferably the pole strength of the magnetic material 12 is at least 27 megagauss oersteds. More preferably, the magnetic material 12 is selected from the group of anisotropic sintered neodymium iron boron or samarium cobalt. Further, the magnetic material 12 can be any number of simple shapes. Preferably, the magnetic material 12 is shaped substantially rectangularly (i.e., as a six sided solid, with each side substantially in the shape of a rectangle).

The magnetic material 12 is attached directly to the holding device 14. The attachment of the magnetic material 12 to the holding device 14 is important to the alignment of the magnetic material 12 relative to the drive arm 16. The magnetic material 12 should be attached with its magnetic field aligned with the drive arm 16 within a tolerance of ±5°; preferably, within a tolerance of ±2°; more preferably, within a tolerance of ±1°.

Figure 4:
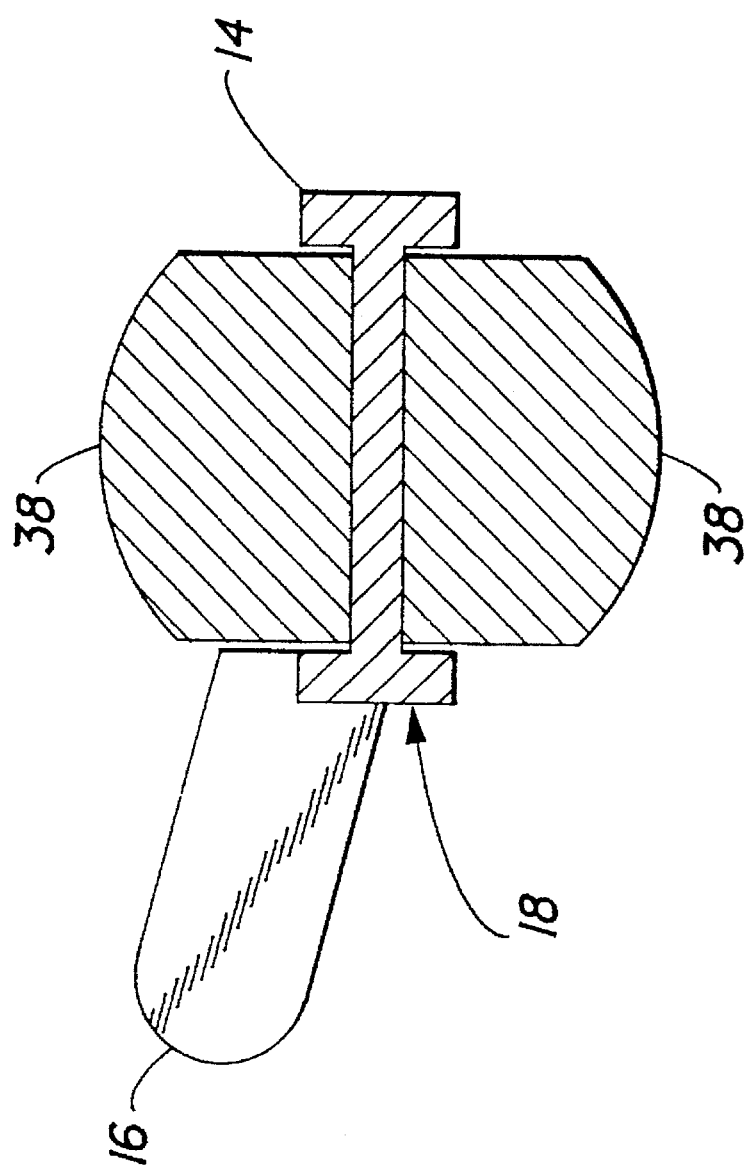
FIG. 4 is a sectional view of an embodiment of the magnetic assembly according to the present invention.

The holding device 14 can be made of any suitable material. Preferably the holding device 14 is made of a non-magnetic material. As shown in FIG. 1, in one embodiment of the invention, the magnetic material 12 includes a first magnet 20 and a second magnet 22. Preferably, the first magnet 20 and the second magnet 22 are shaped rectangularly. In this preferred embodiment of the invention, the holding device 14 includes a frame having a first inner area 24 defined on four sides by walls 26 that serve to position the first magnet 20, a second inner area (not shown) defined on four sides by walls 26 that serve to position the second magnet 22 in a fixed location relative to the first magnet 20, and a wall or web 28 which separates the first magnet 20 and second magnet 22. The first magnet 20 has a first side 30 having a north pole and a second side 32 having a south pole. Similarly, the second magnet 22 has a first side 34 having a north pole and a second side 36 having a south pole. The first magnet 20 and the second magnet 22 are positioned to magnetically align the magnetic fields of the first magnet 20 and the second magnet 22 by positioning the first magnet's 30 second side 32 facing the wall or web 28 and by positioning the second magnet's 32 first side 34 facing the wall or web 28. Preferably, the first magnet 20 and second magnet 22 are held in the holding device 14 by the magnetic attraction of the first magnet 20 and second magnet 22 and as a result, no glue or other method of attachment is necessary, although friction may also be employed. Another embodiment of the present invention is illustrated in FIG. 4. The illustrated assembly shows the first side 30 of the first magnet 20 and the second side 36 of the second magnet 22 having a rounded face 38.

As described above, one embodiment of the invention is a magnetic assembly having a first magnet 20 and a second magnet 22 held in a holding device 14 by the magnetic attraction between the first magnet 20 and the second magnet 22. As a result, several disadvantages in the known art are overcome. First, precise alignment of the first magnet 20 and the second magnet 22 to the drive arm 16 is accomplished due to the reliable placement of the first magnet 20 and the second magnet 22 in the holding device 14. Second, precise alignment of the magnetic field caused by the first magnet 20 and the second magnetic 22 to the rotating mechanism 18 and drive arm 16 is attained by machining magnets from large, preoriented stock. Third, simple and secure attachment of the first magnet 20 and the second magnet 22 to the holding device is accomplished without the need for adhesives or complicated assembly procedures or fixtures.

Fourth, the ability to use strong magnetic materials such as anisotropic sintered neodymium iron boron provides torque advantages. Specifically, in one embodiment of the present invention, the assembly 10 rotates in an electromagnetic actuator. In this embodiment, the assembly 10 rotates about a fixed axis within the actuator (not shown) in response to a magnetic field electromagnetically produced within the actuator. Due to the use of strong magnetic materials, the torque force transmitted via the assembly's drive arm 16 is increased. In another embodiment of the present invention, the assembly 10 is used in an electromagnetic actuator for a camera shutter. In this embodiment, the drive arm 16 is operably connected to a camera shutter (not shown). As a result of the torque advantages of the present invention, the operational characteristics of an actuator, comprising in part the assembly 10 of the present invention, are also improved.

Fifth, the ability to use strong magnetic materials such as sintered neodymium iron boron also provides size and inertia advantages. Specifically, the use of relatively strong magnetic materials permits less magnetic material to be used to achieve the same magnetic strength than if weaker magnetic material were used. As a result, the size of the assembly 10 is reduced. Additionally, the inertia is reduced during rotation due to the weight of the assembly 10 being reduced.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

| ELEMENTS IDENTIFIED BY REFERENCE NUMERAL | |
| --- | --- |
| Reference Numeral | Element |
| 10 | assembly |
| 12 | magnetic material |
| 14 | holding device |
| 16 | drive arm |
| 18 | rotating mechanism |
| 20 | first magnet |
| 22 | second magnet |
| 24 | first inner area |
| 26 | walls |
| 28 | web |
| 30 | first side of first magnet |
| 32 | second side of first magnet |
| 34 | first side of second magnet |
| 36 | second side of second magnet |
| 38 | rounded face |

What is claimed is:

1. An assembly for use in an electromagnetic actuator, comprising:

(a) at least two pieces of magnetic material, each having a north pole and a south pole;

(b) means for magnetically holding said magnetic material in a fixed position relative to said holding means; and (c) rotation means for permitting rotation of said holding means, wherein said north pole and said south pole of said magnetic material are oriented substantially perpendicular to an axis of rotation of said rotation means, wherein said two pieces of magnetic material are held in said fixed position relative to said holding means by mutual magnetic attraction to each other.

2. An assembly as claimed in claim 1 wherein said holding means comprises non-magnetic material.

3. An assembly as claimed in claim 1 wherein said magnetic material comprises a first magnet and a second magnet.

4. An assembly as claimed in claim 3 wherein said first magnet and said second magnet each comprise six sides which are rectangularly shaped.

5. An assembly as claimed in claim 1 wherein said magnetic material has a pole strength of at least 27 mega gauss oersteds.

6. An assembly as claimed in claim 1 wherein said magnetic material has a noncylindrical shape.

7. An assembly for use in an electromagnetic actuator, comprising:

(a) a first magnet having a north pole and a south pole;

(b) a second magnet having a north pole and a south pole;

(c) a drive arm;

(d) means for magnetically holding said first magnet and said second magnet in a fixed position relative to said holding means, wherein said first and second magnets am held in said fixed position relative to said holding means by mutual magnetic attraction to each other; and (e) means for permitting rotation of said holding means in said actuator.

8. An assembly as claimed in claim 7 wherein said holding means comprises non-magnetic material.

9. An assembly as claimed in claim 7 wherein said magnetic material is selected from the group comprising anisotropic sintered neodymium iron boron and samarium cobalt.

10. An assembly as claimed in claim 7 wherein said holding means holds said north and south poles of said first magnet and said second magnet substantially perpendicular to the axis of rotation of said holding means.

11. An assembly for use in an electromagnetic actuator, comprising:

(a) a first magnet having a north pole and a south pole;

(b) a second magnet having a north pole and a south pole;

(c) a drive arm;

(d) a frame comprising non-magnetic material for magnetically holding said first magnet and said second magnet in a fixed position relative to said drive arm, wherein said first and second magnets are held in said fixed position relative to said drive arm by mutual magnetic attraction to each other; and (e) means for permitting rotation of said frame in said actuator.

12. An assembly as claimed in claim 11 wherein said frames holds said north and south poles of said first magnet and said second magnet substantially perpendicular to the axis of rotation of said frame in said actuator.

13. An assembly as claimed in claim 11 wherein said first magnet and said second magnet each comprise six sides which are rectangularly shaped.

14. An assembly as claimed in claim 11 wherein one side of said first magnet and one side of said second magnet are rounded.

15. An assembly as claimed in claim 11 wherein the first side of said first magnet and the first side of said second magnet are oriented having a north pole and wherein the second side of said first magnet and the second side of said second magnet, which are perpendicular to said first sides, are oriented having a south pole, and wherein said first side of said first magnet and said first side of second magnet are parallel to the axis of rotation of said frame in said actuator.

16. An assembly as claimed in claim 1 wherein said magnetic material is held by said holding means in the absence of glue.

17. An assembly as claimed in claim 1 wherein said magnetic material is hardened magnetic material formed in a shape for use in said assembly.

18. An assembly as claimed in claim 1 wherein said assembly is used to activate a camera shutter.

* * * * *

UNITED STATES PATENT AND TRADEMARK OFFICE
CERTIFICATE OF CORRECTION

PATENT NO.   : 5,561,486
DATED        : October 1, 1996
INVENTOR(S)  : Jude A. SanGregory It is certified that an error appears in the above-identified patent and that said Letters Patent is hereby corrected as shown below:

Col. 6, line 8, "am" should read --are--

Signed and Sealed this

Sixth Day of May, 1997

Attest:

Attesting Officer

BRUCE LEHMAN
Commissioner of Patents and Trademarks